United States Patent [19]
Collin

[11] 3,908,072
[45] Sept. 23, 1975

[54] METHOD AND FURNACE FOR THE MELT REDUCTION OF METAL OXIDES

[75] Inventor: Per Harald Collin, Falun, Sweden

[73] Assignee: Allmanna Svenska Elektriska Aktiebolaget, Vasteras, Sweden

[22] Filed: Jan. 21, 1974

[21] Appl. No.: 434,887

[30] Foreign Application Priority Data
Jan. 23, 1973 Sweden.......................... 7300939-1

[52] U.S. Cl..................................... 13/26; 75/10 R
[51] Int. Cl.² ........................................ F27D 11/06
[58] Field of Search .................. 13/26, 27, 20 S, 34; 266/34 A; 259/DIG. 46; 75/10 R, 11

[56] References Cited
UNITED STATES PATENTS
3,239,204  3/1966  Hokanson .......................... 13/26 X Primary Examiner—R. N. Envall, Jr.
Attorney, Agent, or Firm—Kenyon & Kenyon Reilly Carr & Chapin

[57] ABSTRACT

Metal oxide particles, such as particulated iron ore, are fed to the surface of a molten metal melt containing carbon which reduces the oxides and thus adds the metal to the melt. The latter's carbon content, necessary for the reduction, is maintained by feeding carbonaceous material to its surface, the carbon with time, dissolving in the melt. The latter is heated by an electric induction coil designed to induce electric currents in the melt with a flux field pattern causing a bulge to form upwardly in the melt in the shape of a closed loop having inner and outer descending slopes of oppositely flowing molten metal, this loop of bulging metal being largely above the level of slag formed from gangue included by the oxides, and presenting metal surfaces which are free from slag or naked. The particulated oxides are fed to the inner slope so that metal is added to the melt while the slag collects in what is in effect a valley or basin formed in the melt within the upwardly bulging loop of metal. The melt is contained in an electric induction furnace hearth having an upstanding side wall surrounding the bulging loop at a distance forming an annular or peripheral valley of molten metal which free from slag because the oxides are not fed to the outer slope of the loop. The carbonaceous material required to maintain the carbon content of the melt, is fed to this outer slope and collects in this peripheral valley on naked metal free from slag, permitting the carbon to dissolve into the melt without interference by a slag barrier. A special induction furnace is provided wherein, among other features, the necessary induction coil is designed so that at one localized portion of the upwardly bulging loop of melt, the height or upward elevation of the bulge is lowered, the furnace having a tap hole in its side wall at this location for permitting the removal of slag collected in the basin or inner valley as well as the metal obtained by reduction of the oxides.

13 Claims, 4 Drawing Figures

METHOD AND FURNACE FOR THE MELT REDUCTION OF METAL OXIDES

BACKGROUND OF THE INVENTION

The present invention relates to the melt reduction of metal oxides to obtain their metal component. The latter may be any of those whose oxides can be reduced when added to a carbonaceous molten metal bath containing adequate carbon in solution, an example being the addition of iron ore to a molten iron bath or melt of adequate carbon content.

The above type of reduction involves, of course, the use of a furnace having a hearth surrounded by a side wall and containing the melt, the metal oxide particles being particulated to a relatively fine grain size and being fed to the bath in which the carbon is dissolved. These oxides may be ore concentrates, pyrite ashes or material partly metallized by pre-reduction. This feeding may be continuous, thus requiring the continuous feeding of carbonaceous material to the melt, the latter continuously being removed from the furnace along with the slag resulting from gangue contained by the oxides, the latter seldom being exclusively composed of only the desired metal in its oxide form. The carbonaceous material may be carbon in the form of coke or anthracite breeze or soot, and also particulated to a relatively fine grain size.

The prior art has suggested that the metal oxide and carbon particles be injected into the molten carbonaceous metal bath. This suggestion involves the disadvantage that the great volumes of carbon monoxide gas resulting from the vigorous reaction between the carbon and the oxygen of the oxides, bubble up through the bath and the inevitably formed slag on top of the bath, causing the molten metal to be thrown upwardly and the slag to foam, thus reducing greatly the potential reduction capacity of the bath per square meter of its surface. This has prevented this injection procedure from having any substantial industrial importance.

Various improvements have been suggested, submerging of the additives into the molten bath by inductive stirring being one of them, this being exemplified by Swedish Pat. No. 208,538. A somewhat similar suggestion is exemplified by German Pat. No. 639,658, as well as by a Swedish patent application No. 16348/69. To avoid the boiling action resulting from the reaction between the oxides and the carbon when injected or submerged internally within the molten bath, Swedish Pat. No. 111,625 suggests the feeding of fine grain particles of the oxides onto the surface of the carbonaceous melt, this surface being kept clear from slag by removing it as soon as it forms to thereby maintain a slag-free or naked molten metal surface. This results in a quick reaction between the fine grained oxide particles and the surface of the carbonaceous melt; this quick reaction has become known as the Schmelzspiegel reaction. Its reaction rather strongly depends on the particle size of the oxides, and the melt temperature and carbon content. When reducing iron ore, for example, the melt temperature should be about 1,400°C or more, the reaction involved being, of course, endothermic, the heat required being furnished via electric induction heating, but inductive stirring being avoided. The potential advantage of this practice is that a very high reduction rate and capacity per square meter of the melt surface should be attainable; the disadvantage is the practical one of keeping the melt surface free from slag while simultaneously providing the melt with a sufficient content of dissolved carbon, time being required to dissolve carbon in molten metal such as iron.

To improve on this naked metal surface addition practice, Swedish patent application No. 5211/72 suggests the creation of an upflow in the molten metal to obtain an upstanding bulge above the balance of the melt, the oxides and carbonaceous materials, in particle form, possibly intermixed, being blown on the naked surface formed by the bulge rising as naked metal above the level of the slag floating on the melt. The added carbonaceous material flows downwardly from the bulge to a lower area to form there a layer of coke formed by the residue of the added carbonaceous particles. Slag also flows to this lower area. In this case there is the disadvantage that the dissolving time of carbon in molten metal, such as iron, is slow as compared with the reduction of the oxides by the Schmelzspiegel reaction, the slag in the lower area rapidly increasing and floating the carbonaceous material upwardly and separating it from the melt. This limits the reduction capacity of this practice to one making it of less interest when large production rates are required, such as those characteristic of the steel industry.

The foregoing shows that the metal oxide melt reduction practices heretofore known have all involved one problem or another, and the object of the present invention is to overcome these problems.

SUMMARY OF THE INVENTION

A fundamental concept of the present invention is also the formation of an upward bulge in the carbonaceous metal, particularly iron containing dissolved carbon, but with the bulge contoured to form separated valleys, channels or basins on opposite sides of the bulge. To produce such a bulge, the invention provides a furnace having a hearth formed by a substantially flat bottom wall of extended area and a peripheral side wall and in which the melt is contained, the bulge being caused to form by an appropriately shaped or contoured flat or single layer induction coil positioned flatly beneath the hearth and close to the melt.

One example of a suitably contoured bulge of melt surface is one or more ridges extending the length of the hearth and enclosing valleys separated from each other by being closed at their ends by the side wall of the hearth. More preferably, the bulge is formed, by appropriate design of the induction coil, in the form of an endless loop having inner and outer slopes extending downwardly in opposite directions to the balance of the melt surface. Even more preferably this loop is formed as an elongated loop having parallel sides, defining the ridges previously referred to but with the ridges joined at their ends by the curved ends of the loop contour, thus defining an inner valley or basin and an outer valley or channel peripherally formed around the loop bulge between its outer slope and the hearth's side wall.

The major portion of this contoured bulge extends above the slag level and presents an extended area of naked metal onto which the oxide and carbonaceous particles may be fed for the Schmelzspiegel reaction. However, in the case of the present invention the oxide particles are fed only to the inner descending slope of the bulge loop, and the carbonaceous material particles are fed only to the descending outer slope. In this way the slag collects only in the inner basin or valley enclosed by the loop of bulging metal, while the carbonaceous material collects only in the outer valley or channel peripherally surrounding the loop bulge and which is free from slag. Therefore, the carbonaceous material, such as coke, remains in direct contact with the melt at all times, providing time required for the continuous addition of the carbon to the melt by dissolving in the latter. In this case coke formed from the carbonaceous material floats directly on naked metal; there is no slag barrier between the coke and the metal.

The melt reduction of metal oxides is inherently continuous, the melt being continuously tapped and the oxides and carbonaceous materials being continuously added. This also applies to the present invention. The carbonaceous material on the outside of the bulging loop of melt continuously dissolves into the melt. The melt and slag must be removed without the slag getting into this outer valley or channel where it could form the previously described barrier.

Therefore, the present invention provides a furnace having the hearth designed so that in a localized area the peripheral continuity of the above outer valley is interrupted by interspaced dams defining between them a space or passage, the dams protecting or shielding the carbonaceous material or coke; the induction coil is designed so that at this area the height of the loop or bulge of the melt, is reduced closely or substantially to the level of the inner valley or basin confined within the loop bulge; at this location the furnace is provided with a tap hole formed in the hearth's side wall at a level permitting slag to flow continuously from this inner basin. As the volume of the melt increases due to the addition of the reduced metal, the melt can also flow through this tap hole. The action would normally be continuous with both melt and slag flowing through the tap hole, the slag being removed from the melt leaving the furnace in any of the usual ways employed when it is necessary to skim off slag from molten flowing metal. The removed carbonaceous melt, such as high-carbon iron, can be further refined in any of the known ways.

The invention involves other features which can be understood from the following disclosure of specific examples of the invention.

BRIEF DESCRIPTION OF THE DRAWINGS

The accompanying drawings, showing these examples, are entirely schematic in character, the various figures being as follows.

DETAILED DESCRIPTION OF THE INVENTION

Figure 1:
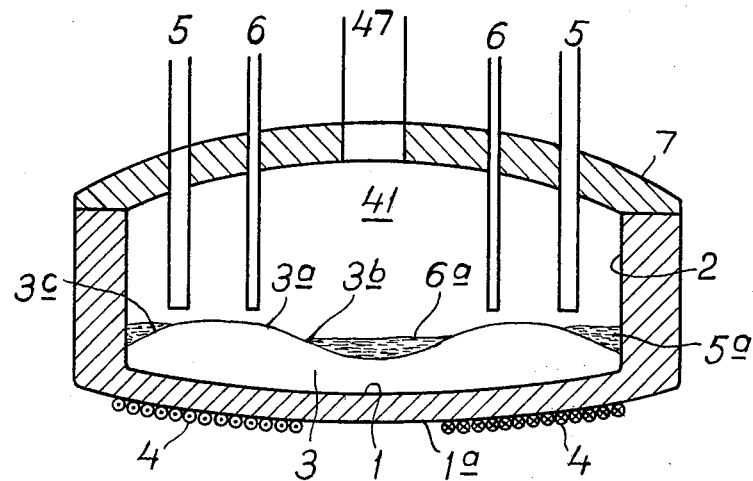
FIG. 1 is a vertical section of a furnace and is intended to illustrate the basic principles of the present invention.

In FIG. 1 a substantially flat, although slightly concave, refractory hearth 1 is shown with a peripheral side wall 2, the contained molten carbonaceous metal or melt being indicated at 3. The electric induction coil is shown in cross section as a loop formed by an appropriate number of convolutions of an electric conductor suitable for use for induction heating of metal on the hearth 1 within the wall 2. This coil is formed as a single flat layer 4 arranged flatly against or adjacent to the bottom 1a of the hearth 1 and as closely to the metal bath 3 as is consistent with good furnace engineering. The contour of the coil 4 should follow the contour of the hearth 1 and furnace wall 2, being, of course, an endless loop excepting for the connecting electric conductors (not shown) by which the coil is connected to the power source. The normal main current supply with a frequency of 50–60 cycles per second may be used to energize this coil.

The contour of the melt is indicated by FIG. 1 with the upwardly bulging loop of the melt 3 indicated as having, in vertical cross section, a crest $3a$, an inner slope $3b$ and an outer slope $3c$. The coil 4 is located so that the crest $3a$ of the upwardly bulging loop of metal projects a substantial distance upwardly from the balance of the melt, the portions of the slope $3b$ and $3c$ being also located above the general melt level.

The coil 4, when energized by alternating current of the normal mains frequency, previously indicated, and with adequate power, causes the melt 3 to have the upwardly bulging annular loop indicated, the induced metal flow being indicated by the arrows in FIG. 1. The induced electric currents in the bath provide a flux field pattern causing this bulge to form as an annular ridge having the oppositely descending slope $3b$ and $3c$, the metal flowing from the crests $3a$, oppositely descending down these slopes as indicated by the previously mentioned arrows. This furnace of FIG. 1 is shown with the pipes or chutes 5 which feed the carbonaceous material to the outwardly extending or outer slope $3c$, and with pipes or chutes 6 feeding the metal oxides, such as iron ore, to the inner slope $3b$. The respective materials are fed to opposite sides of the crest $3a$.

When in operation, the oxides are reduced by direct contact with the inner slope $3b$ of the naked metal, the latter having an extensive surface due to the bulging metal having the loop contour. Slag collects in the basin or valley formed within the annular slope $3b$, as indicated at $6a$. This central valley or basin is entirely segregated from the peripheral valley formed between the outer slope $3c$ of the annular bulging metal, and the inside of the furnace wall 2, the carbonaceous material, or coke, collecting in this valley as indicated at $5a$. The carbon monoxide gas formed by the reaction is drawn off via an outlet 8 from the furnace cover 7 and through which the chutes or pipes 5 and 6 extend downwardly to feed to the locations previously described.

Now it can be seen that the slag constantly collecting at $6a$ is entirely segregated from the carbonaceous material $5a$ collecting in the outer periphery. The carbonaceous material $5a$, normally ending as coke if not initially in this form, floats in direct contact with the melt 3 without any intervening layer of slag, allowing time for the carbon to constantly dissolve into the melt. As explained hereinafter, the melt and the slag within the interior or central basin formed by the annular ridge or bulge of metal, can be continuously withdrawn with the slag separated from the melt by known techniques. The metal oxides, and iron oxides in one form or another are particularly contemplated, are fed in particulated form through the pipes or chutes 6, which although not shown by FIG. 1, are designed to effect a generally uniform feeding entirely along the inner slope $3b$ of the raised, bulged or ridged loop having the crest $3a$, the carbonaceous material being fed through the pipes 5 in particulated form and distributed uniformly over the area of the slope 3c descending from the annular ridge of metal formed by the inductor coil 4.

It can be seen that the slag 6a is completely segregated from the coke 5a floating in direct contact with the metal bath 3 and that the slag 6a formed by the reduction of the oxide particles continuously fed through the pipes or chutes 6, is completely segregated and kept away from the carbonaceous material 5a.

In the foregoing way the basic principles of the present invention are shown.

Figure 2:
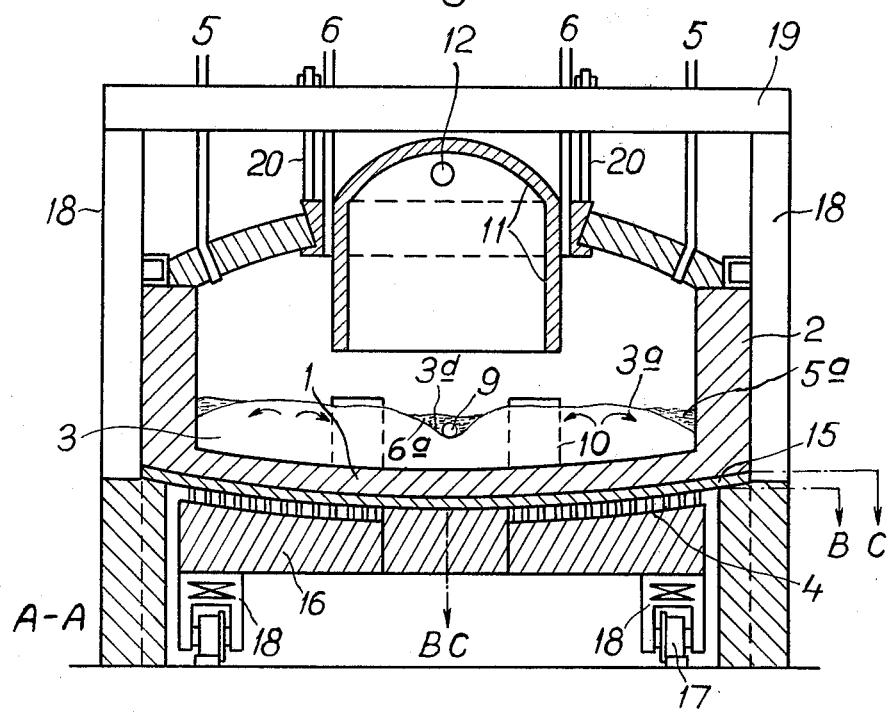
FIG. 2 is also a vertical section of a furnace but shows certain of the details contributing to the practical practice of the invention.
Figure 3:
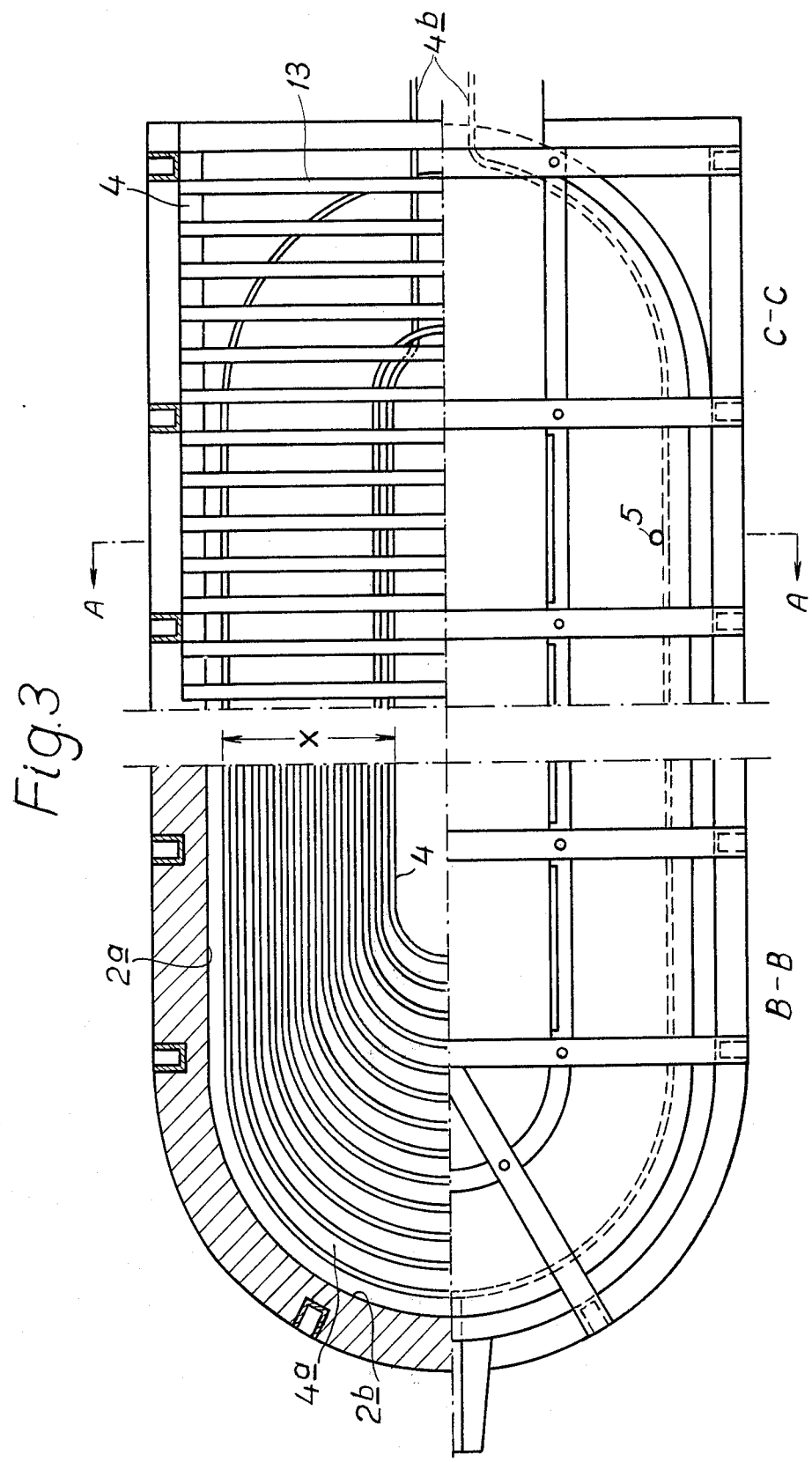
FIG. 3 in horizontal cross section shows on the left-hand portion of this figure an electric inductor coil, while on its right-hand portion this figure shows a supporting arrangement for this coil.

In FIGS. 2 and 3 a practical furnace construction is schematically disclosed for carrying out the method of this invention.

In these two figures, the hearth 1 is again shown as being substantially flat insofar as flatness is consistent with furnace hearth construction. It may be of an extensive area horizontally since the height of the bath melt to be supported need not be great. The side wall is shown, but in this instance it is formed with an elongated shape having parallel straight sides 2a and rounded or semicircular ends 2b. The melt is again indicated at 3 with the understanding that in this instance the pattern of the melt surface bulge is an elongated loop having parallel side ridges with rounded or semicircular ends, the metal flow being otherwise as indicated in FIG. 1.

The electrical inductor coil 4 is shown in this instance as having the form also of an elongated loop as indicated by FIG. 3 and at one end the pitch or mutual convolution interspacing is substantially increased over the balance as shown at 4a in FIG. 3. Therefore, in this region or localized portion the currents induced in the melt 3 are reduced in intensity per cubic area of the melt, producing in the crest 3a a lowered portion 3d which is localized and provides an exit passage or trough to a melt and slag tap opening 9 through which the slag 6a is continuously removed at one end of the furnace. At this localized portion horizontally interspaced dams 10 close off the channel or outer peripheral trough or valley containing the carbonaceous material 5a so that the latter is retained for the continuous dissolving of carbon into the melt. In this way the melt and the slag are continuously removed from the furnace while the carbonaceous material continues to remain in direct contact with the melt.

In FIG. 2 the furnace cover is again shown with the peripherally encircling pipes or chutes 5 for the carbonaceous material, and 6 for the oxides, such as iron ore. In this instance, the furnace cover 7 is provided with a centralized gas dome 11 in which the carbon monoxide formed by the reaction between the carbon and the oxygen of the oxides, collects, and this dome has an inlet 12 for introducing air to it, or oxygen in some other form, so that the collected gas is wholly or partially burnt and adds heat to the melt in the furnace.

Concerning heating, it is, of course, to be understood that the coil 4 serves the usual purpose of heating the melt by induced currents as well as performing the new function of creating the annular loop of upwardly bulged melt featuring the present invention. As shown by both FIGS. 1 and 2, the inductor coil 4 is a flat coil which may comprise a single layer winding placed as close to the melt as is possible. The coil may be made of copper tubing which is water-cooled, the pitch of the coil being as small as is possible considering the insulation required between the coil convolutions, excepting at the end indicated at 4a in FIG. 3 where the pitch is increased as previously described. The coil may have terminating ends 4b for connection with the source of electric power. The usual mains frequency of 50–60 cycles per second is adequate to form the loop bulge described when adequate current is passed through the inductor coil. For example, 650 kilowatts per square meter of flat coil area provides such a vigorous upflow of molten metal as to form a bulge of adequate height to meet practical operating conditions.

The crest 3a is formed centrally with respect to the width of the layer of conductors defining the loop, such as between the distance X indicated in FIG. 3, the coil portion 4a, of course, forming the lower bulge height. The electric currents induced in the molten metal provide the flow pattern indicated, particularly by FIG. 1, sweeping the oxide and carbonaceous particles into the respective areas previously described. The particle size of the metal oxide material should preferably be less than 1mm. and this oxide material may contain small percentages of carbon, for example, in the form of soot produced during pre-reduction if the oxides have been subjected to such a pretreatment. Particularly in the case of the oxide feeding, the feeding should be continuous and with a uniform flow distributed over the entire area of the inner slope 3b as much as possible, as by using a series of the charging pipes or chutes 6 with the pipes of the series closely interspaced. With the molten metal flowing, as indicated particularly by FIG. 1, at a speed of 1m/sec., a relatively high rate of oxide particle feed is possible.

If the bulge height reduction shown at 3d is not desired, the slag and molten metal may be removed from the basin formed within the annular rim or bulge of upwardly extending bath metal, by an overflow pipe (not shown) extending upwardly to an appropriate height within the basin or valley formed within the endless loop bulge of melt.

In the furnace shown by FIGS. 2 and 3 the hearth formed by the refractory furnace bottom wall 1 is supported by transverse beams 13 made of stainless steel having ends electrically isolated from each other as by the use of fabric reinforced bakelite, these beams resting on foundation members 14. This prevents the beams from being electrically inductively heated by the flat pancake coil 4, by avoiding a closed coil circuit which might otherwise be formed by a supporting structure. These beams may be water-cooled and the refractory cast between them, thus forming a solid water-cooled bottom indicated at 15 in FIG. 2, on which the refractory hearth 1 rests.

The flat pancake inductor coil 4 is shown in FIG. 2 as being carried by a trolley support 16 having wheels 17 and provided with vertical lifting and lowering means very generally indicated at 18. Although the furnace bottom is substantially flat, it is of necessity slightly concave on its inside and convex on its outside, as required by furnace engineering, and the substantially flat pancake inductor coil 4 is correspondingly shaped so it can fit snugly against the refractory cement cast between the stainless steel beams 13, to obtain an inductive coupling between the coil and the melt that is is efficient as possible. This arrangement, by lowering via the device 18, permits the coil 4 to be dropped removably from the furnace bottom and run out on the trolley 16 for inspection and possible repair, when considered necessary.

Otherwise than required by the present invention, normal furnace designing features may be used. For example, the side of the elongated furnace may be supported by upstanding frame members 18 supporting roof beams 19 which may be used to support the dome and the roof via tension bars 20.

Figure 4:
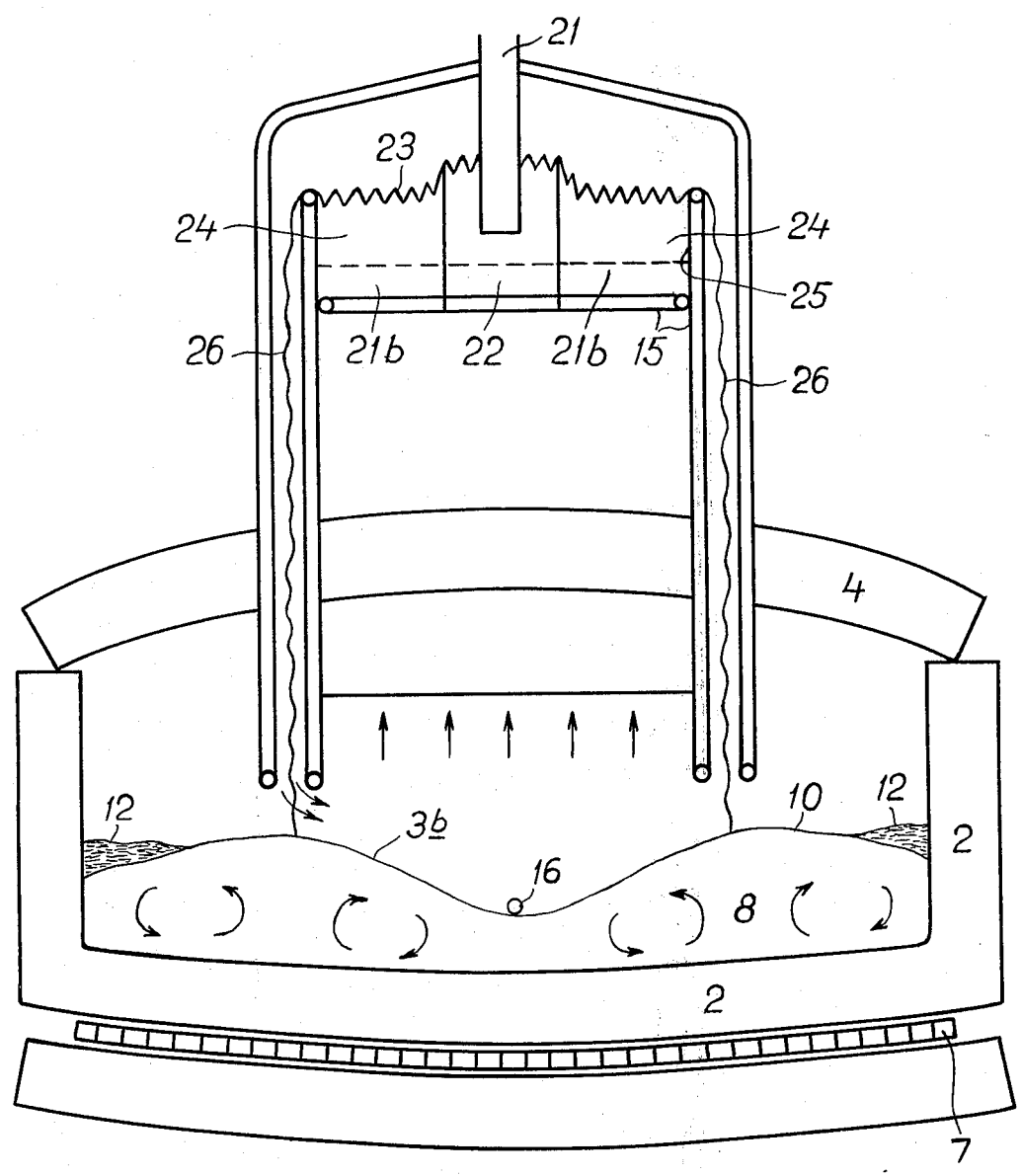
FIG. 4 is a view like FIG. 2 but shows a modification.

The feeding arrangement for the oxides shown at 6 in FIGS. 1 and 2 are suitable to permit the gravitational fall of oxide particles providing they are not of too fine a grain size. In FIG. 4 a modification is shown for handling oxides of finer grain size, such as smaller than even 100 microns for instance.

In this modification of FIG. 4 very finely grained, possible pre-reduced, hot oxide material is fed through the feeding pipes 21 into a trough 22 extending lengthwise with respect to the furnace, here to be fluidized by the introduction of gas under pressure such as might be represented by a carrier gas carrying the very fine materials into the trough through the pipes 21, there preferably being a series of these pipes 31 extending along the trough 22. With the fine grained oxide distributed throughout the length of the trough and continuously fed, this material, as indicated by the zig-zag line 23, overflows the sides of the trough into side troughs 24 defined by outer walls 25 over which the very fine material gravitationally falls down through side chutes 26 to the downward inner slopes 3b of the loop bulge of the melt.

The pressure introduced by the carrier flow is effective to make this a forced feed and because of the extremely fine grain size of the material, there is a very quick reaction between it and the naked metal of the carbonaceous metal melt, thus avoiding the fine oxides from flowing about as dust, at least to a very substantial extent. The fine oxides flow down like curtains on the descending slopes 3b. The walls required to define the troughs and the chutes may be formed by interwelded pipes, permitting water-cooling, and which may also serve to define the equivalent of the dome 11 shown by FIG. 2, permitting the collection and disposal of gases within the furnace.

What is claimed is:

1. A method for reducing metal oxides by feeding the oxides to the surface of a molten metal bath containing carbon and in which an upflow of the metal is caused to form an upstanding bulge free from slag and to which the oxides are fed for said reduction; wherein the improvement comprises inducing electric currents in said bath with a flux field pattern causing said bulge to form in the shape of a ridge having oppositely descending slopes of oppositely flowing molten metal.

2. The method of claim 1 in which said oxides in particulated form are fed to one of said slopes and the carbon content of said bath is maintained by feeding carbonaceous material to the other of said slopes.

3. The method of claim 2 in which said flux field pattern causes said bulge to form an upward bulging closed loop and said oxides are fed to the inside slope of said loop.

4. The method of claim 3 in which said loop is elongated and has straight sides which are mutually parallel.

5. The method of claim 3 in which said bath is peripherally surrounded by walls and said loop is spaced therefrom so that a peripheral valley of molten metal is formed therearound, said carbonaceous material being fed to the outside slope of said loop.

6. The method of claim 4 in which said loop forms therewithin an inner valley of said molten metal, said metal oxides including gangue forming slag in said valley, and said induced electric currents in said bath are locally reduced at one end of said elongated loop to lower its upstanding height locally and form a channel through which said slag runs off from said inner valley.

7. The method of claim 6 in which said bath is peripherally surrounded by walls and said loop is spaced therefrom so that a peripheral valley of molten metal is formed therearound, said carbonaceous material being fed to the outside slope of said loop, said molten metal bath being ferrous and said oxides being iron oxides.

8. The method of claim 7 in which said electric currents have a frequency of about 50 to 60 cycles per second.

9. The furnace for melt reduction of metal oxides, comprising a substantially flat-bottomed hearth having a periphery surrounded by an upstanding wall structure, a flat electric induction coil positioned horizontally below said hearth, said coil having an outer periphery spaced inwardly from registration with said hearth's periphery and the coil having an open central portion, said coil when energized forming in molten metal on said hearth an upward bulge having inner and outer slopes of said metal.

10. The furnace of claim 9 having a roof and means for feeding metal oxide particles through said roof downwardly in registration with said inner slope of said bulge of molten metal and means for feeding carbonaceous material through said roof downwardly in registration with the outer slope of said bulge.

11. The furnace of claim 10 in which said furnace's roof is provided with a gas collection dome provided with means for mixing oxygen with gas collected therein for supporting combustion thereof.

12. The furnace of claim 10 in which said coil is supported on metal beams with ends electrically insulated from each other, said beams being electrically insulated from said coil.

13. The furnace of claim 10 in which said coil at a localized zone has a larger coil pitch than throughout its remainder and said wall structure has a tap hole registered above said zone.

* * * * *